United States Patent [19]
Rushing

[11] 3,762,515
[45] Oct. 2, 1973

[54] APPARATUS FOR SHIELDING PORTIONS OF A VEHICLE

[75] Inventor: James M. Rushing, Arlington, Tex.

[73] Assignee: LTV Aerospace Corporation, Dallas, Tex.

[22] Filed: June 7, 1972

[21] Appl. No.: 260,576

[52] U.S. Cl. .................. 191/8, 317/18 B, 104/51
[51] Int. Cl. ............................................ B60k 1/00
[58] Field of Search ............... 340/248 A; 317/9 R, 317/16, 103, 18 B; 191/1, 2, 3, 8, 45, 49; 104/147, 148, 51; 105/27, 49, 50

[56] References Cited
UNITED STATES PATENTS

| | | | |
|---|---|---|---|
| 3,427,607 | 2/1969 | Oesterle | 340/248 A |
| 3,590,321 | 6/1971 | Scheidweiler | 317/16 |
| 2,895,083 | 7/1959 | Quinlan | 317/9 R |
| 2,565,314 | 8/1951 | Lewis | 317/103 |
| 408,231 | 8/1889 | Griscom | 105/51 |
| 1,742,012 | 12/1929 | Sloane | 191/8 |
| 3,659,152 | 4/1972 | DeLangis | 317/18 B |

*Primary Examiner*—Gerald M. Forlenza
*Assistant Examiner*—D. W. Keen
*Attorney*—James M. Cate et al.

[57] ABSTRACT

An apparatus for ensuring that exposed, electrically conductive elements of a vehicle, which elements receive dangerous levels of electrical power and may present a hazard to bystanders, are covered by insulative shields when power is conducted to the elements. In one embodiment, the brush assemblies of an electrically powered, guideway following vehicle are covered by respective insulative shields, during periods when the vehicle is operated off the guideway, for preventing contact with the brushes by bystanders. Means are provided for conducting power to the vehicle through a power cable connectable to one of the insulative shields.

14 Claims, 7 Drawing Figures

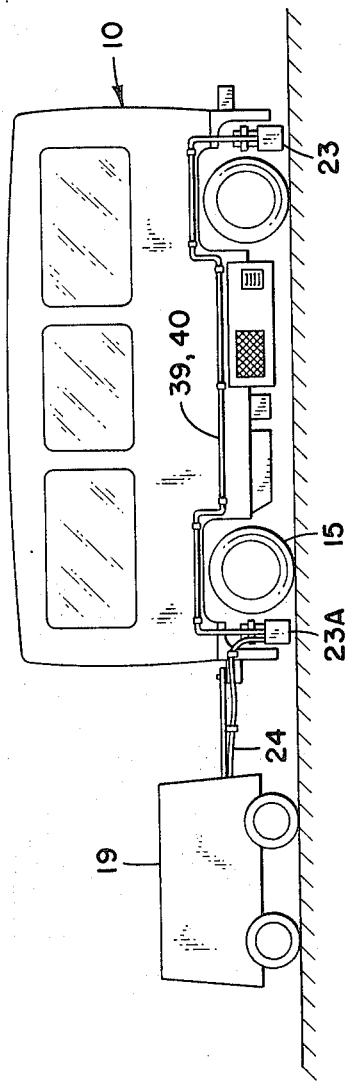
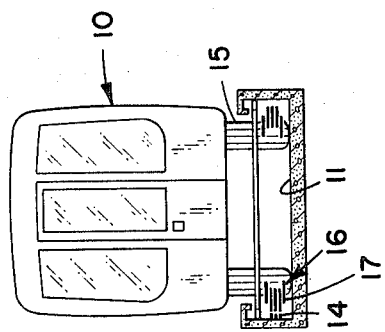

PATENTED OCT 2 1973 3,762,515

APPARATUS FOR SHIELDING PORTIONS OF A VEHICLE

This invention relates to apparatus for insulating a plurality of hazardous electrical components for preventing accidental contact therewith by persons nearby and, more particularly, to apparatus for ensuring that a plurality of power connecting terminals of a vehicle are covered during periods when electrical power is conducted to the terminals.

Electrical components having exposed conductive elements often constitute a hazard when it is necessary to conduct large amounts of power to the conductive elements. For example, electrically powered vehicles of the type having a plurality of power receiving brush assemblies, each assembly including a plurality of brushes for contacting and receiving power from respective, adjacent power rails, may present such a hazard when power is received by the vehicle while at least some of the brushes are exposed. Because the brushes of the several brush assemblies or terminals are normally connected in parallel with corresponding brushes of the other terminals, power received at any one of the terminals is also conducted to the brushes of the other terminals. An example of such a condition exists in the case of a vehicle adapted to travel upon a guideway while receiving electrical power from power rails extending alongside the guideway, which vehicle is also adapted to travel off the guideway when powered by a supplementary power source. The brushes of such a vehicle normally project beyond the wheels and other components of the vehicle for contacting the power rails. Off-guideway operation may be necessary during testing or maintenance of the vehicle, or it may be desirable that the vehicle be routinely operated in areas remote from the guideway. It will be apparent that if the brushes receive electrical power during such off-guideway operation, a quite dangerous condition exists if the vehicle is in the vicinity of passengers or other personnel, or if its brushes may come into contact with adjacent metal structures. Another, analogous problem exists in the case of vehicles which have electrical terminals, having exposed conductive elements, for conducting power from a power source to electrical components within or without the vehicle.

It is, accordingly, a major object of the present invention to provide a new and improved apparatus for shielding electrical terminals on a vehicle when the elements are connected to a power source.

Another object is to provide such an apparatus in which the conductive elements of the respective terminals are covered by insulative shields.

Another major object is to provide such an apparatus which is operable for disconnecting the power source from the conductive elements when an unsafe condition exists.

Yet another object is to provide such a system which is further operable to transmit power to the conductive elements of the respective terminals from a remote power source.

In the drawing:

FIG. 1 is a front view of a vehicle of a type adapted to follow a guideway and having electrical brushes adapted for contacting respective ones of a plurality of power rails extending along the guideway;

FIG. 2 is a side elevation of the vehicle of FIG. 1 and of a portable power supply towed by the vehicle and having electrical connection to the power receiving, insulative shield of the preferred embodiment of the invention;

Figure 3:
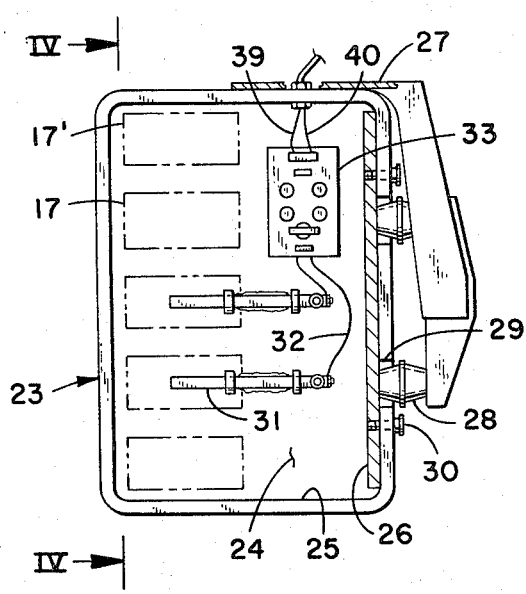
FIG. 3 is a plan view of one of the shields of the present invention showing the inner portions of the shield.

With reference to FIG. 1, an electrically powered vehicle 10 of a type adapted to follow a guideway is shown within a guideway 11. The guideway 11 is provided with a plurality of power rails 14 which extend alongside the vehicle 10 adjacent its wheels 15, the vehicle having a plurality of electrical current collectors means (termed hereinafter "terminals" on "brush assemblies") 16, each including a plurality of conductive elements or brushes 17 adapted to slidably contact respective ones of the power rails for receiving electrical power to drive the vehicle. An example of such a vehicle 10 is disclosed in the co-pending patent application Ser. No. 202,291, filed on Nov. 29, 1971 by W. P. Goode, and the vehicle 10 will not be described in detail herein. Briefly, the wheels 15 have resilient tires which ride on the substantially flat roadway of the guideway, and the vehicle 10 has steering mechanism which permits the vehicle both to follow the guideway 11 and also to operate off the guideway. Controls are provided for permitting steering of the vehicle 10 off the guideway by an operator within the vehicle. During off-guideway operation, the vehicle 10 is suitably powered by an external power source such as a portable generator 19 (FIG. 2) which is towed behind the vehicle, a power cable 13 being provided for conducting power to the vehicle through one of the brush assemblies 16A, as will be described further hereinbelow. Alternatively, the vehicle 10 may be operated for short distances off the guideway 11 by means of power received through an electrical power cable (not shown) connected to a fixed power source and removably connected, through the brush assembly 16A as will be described, to the vehicle 10.

Figure 6:
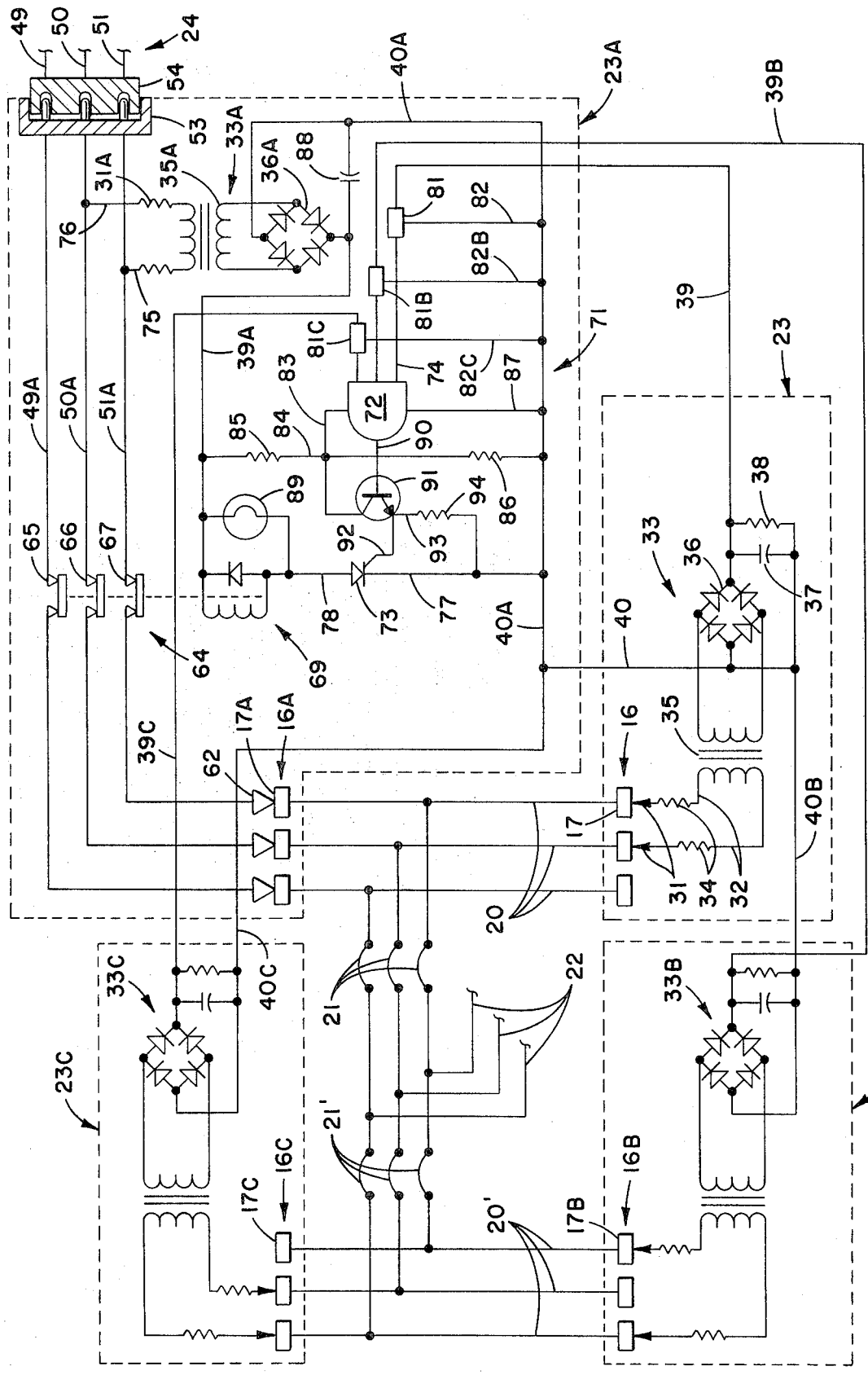
FIG. 6 is a schematic and partially block diagram showing the electrical components of the preferred embodiment.

Referring additionally to FIG. 6, the particular, exemplary vehicle 10 employs front and rear, right terminals or brush assemblies 16, 16A mounted, respectively, on front and rear portions of the right side of the vehicle 10, and front and rear, left terminals 16B, 16C correspondingly mounted on the left side of the vehicle 10. In the present vehicle 10, five brushes 17, 17f are provided at each terminal 16 and positioned one above the other for respectively contacting the conductive rails 14 (FIG. 1) extending alongside the guideway 11. As shown more clearly in FIG. 4, the uppermost and lowermost brushes 17' project, from the vehicle 10, somewhat less than the three center brushes 17 and are provided for receiving vehicle control signals from the corresponding conductive rails 14, the control signals being of relatively low current levels and thus not constituting an electrical hazard. The three center rails 14 are power rails employed to conduct three-phase, 480-volt power to the vehicle 10 for use in powering an electrical motor (not shown) within the vehicle 10. The three center brushes 17, therefore, constitute power-receiving or collecting brushes and are of primary concern with respect to the danger of electrical shock. References hreinafter to the brushes 17 are to the three power receiving brushes unless otherwise noted.

As is known in the art, brushes 17 of respective terminals 16 of such vehicles are normally connected in parallel with corresponding brushes of the other terminals so that power received by the brushes of any one of the terminals is transmitted to the electrical system of the vehicle. Contact with any two of the power-receiving brushes 17 may be hazardous, and simultaneous contact with one of the brushes and with a ground may also be dangerous. The input circuitry of the vehicle 10 is of a conventional type and is thus now described only briefly, with reference to FIG. 6. The right terminals 16, 16A, have their respective power brushes 17 connected in parallel by bus cables 20 which are, in turn, connected through respective circuit breakers 21 to power bus conductors 22 which conduct power received through the brushes to circuitry (not shown) for powering an electric motor which drives the vehicle 10 (FIG. 1). The terminals 16B, 16C, mounted on the right side of the vehicle 10, are similarly connected through cables 20' and through circuit breakers 21' to respective ones of the power bus conductors 22. Thus, the left terminals 16B, 16C are connected in parallel, as are the right terminals 16, 16A, for ensuring that the vehicle receives current continuously from the power rails 14 regardless of the directional orientation of the vehicle 10, according to principles well known in the art. The circuit breakers 21, 21' serve to isolate the power bus conductors 22 from terminals 16, 16A, 16B, 16C in the event of an electrical short within the vehicle 10, a technique also well known in the art. Moreover, unless the circuit breakers 21, 21' are in an open condition, power conducted to the brushes 17 of any of the terminals 16, 16A, 16B, 16C is also present at the corresponding brushes of the other terminals. It will thus be apparent that when the vehicle 10 is driven off the guideway, e.g., while powered by current received from external power source 19 through power cable 13 connected to the vehicle, the power brushes 17 of each of the terminals or brush assemblies 16 are connected to receive power from the power source 19 and may thus constitute a serious hazard to persons nearby.

A plurality of insulative shields 23 is therefore provided for covering the terminals 16 during periods in which electrical power is conducted to the brushes 17. The right, front terminal 16 is covered by a "right front" insulative shield 23, and the front and rear, left terminals 16B, 16C are covered by "left front" and "left rear" insulative shields 23B, 23C, respectively, each of these shields being substantially identical and denoted herein the power sensing shields 23, 23B, 23C. The right, rear terminal 16A is covered by a "right rear" insulative shield 23A which, as will be discussed in a later section, serves to conduct electrical power to the vehicle 10 from the external power source 19 (FIG. 2) and is thus referred to hereinafter as the power connecting shield 23A.

The insulative shields 23, 23A, 23B, and 23C are suitably formed of an electrically insulative material and are each contoured to cover the brushes 17, 17' of a respective one of the terminals 16 when the respective shield is in covering relationship therewith. With reference to FIG. 3, the exemplary, right, front insulative shield 23 is suitably of molded, fibrous-reinforced plastic, having a sheet thickness of approximately 0.25 inches, and is contoured, in accordance with the configuration of the terminal 16 to be covered thereby, to extend over and around the exposed brushes 17, 17' of the terminal. In the present embodiment, the shield 23 has a major body portion 24 of approximately flat configuration and rectangular plan, the body portion 24 being continuous with a peripherally continuous rim portion 25 which projects perpendicularly from the major body portion 24 and toward the vehicle 10 for a sufficient distance to prevent accidental contact with the brushes 17, 17' from the side.

Figure 4:
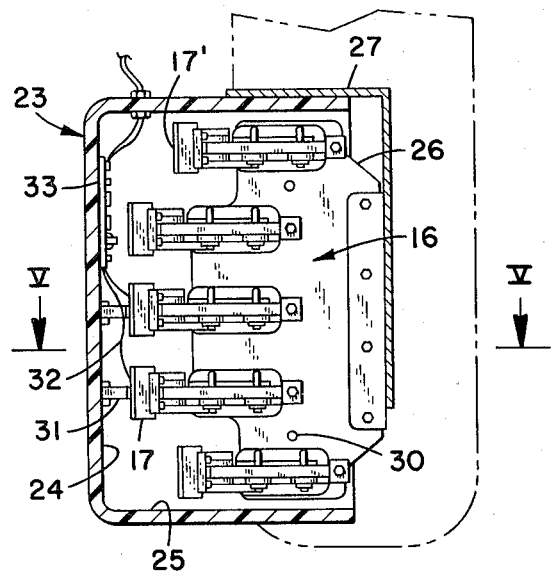
FIG. 4 is a sectional view, taken along lines IV—IV of FIG. 3, of the shield mounted on the vehicle.
Figure 5:
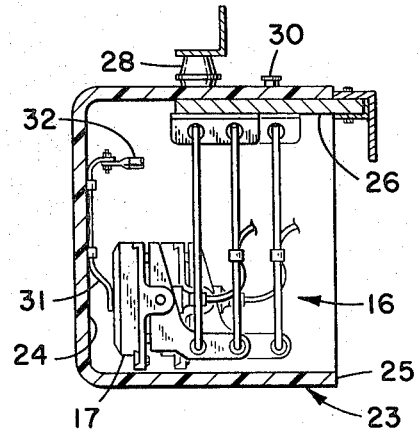
FIG. 5 is a sectional view taken on the line V—V of FIG. 4.

As shown most clearly in FIGS. 3 and 4, the shield 23 is configured in such a manner that it may be conveniently fastened to existing structure on the exemplary vehicle 10. In the present vehicle 10, the brushes 17, 17' are mounted on respective linkages which are connected to a flat, vertical, mounting plate 26 which extends transversely of the vehicle 10 and, with respect to the right, front brush assembly 16 and as shown in FIGS. 3–5, is adjacent to and spaced forwardly from the right front, wheel 15. The brushes 17, 17' are mounted forwardly of the vertical mounting plate 26 on conventional, spring-biased linkages which permit lateral movement of the brushes relative to the vehicle. A horizontal plate-like member 27 is positioned adjacent and in perpendicular alignment with the vertical mounting plate 26. These plate members 26, 27 thus provide appropriate mounting surfaces for the shield 26, and the shield rim 25 is configured with its side and top surfaces in substantially planar configuration, perpendicular to each other, so that the shield 23 may be seated against the rear surface of the vertical mounting plate 26 and against and below the horizontal plate member 27. In the present embodiment, the vertical mounting plate 26 is supported by two insulators 28 which project rearwardly therefrom. Horizontal slots or cutout areas 29 are therefore formed in the corresponding, adjacent portion of the shield rim 25 in register with the insulators 28 for preventing obstruction of the shield 23 by the insulators 28 as the shield is moved across the vertical plate 26 and toward the center of the vehicle 10 during installation, thus permitting the shield rim 25 to be extended past the insulators 28 and the shield 23 to be conveniently fastened over the vertical plate 26 and in covering relationship with the brush assembly 16.

Means are also provided for permitting the shield to be conveniently and removably affixed or fastened in place. Such fastening means suitably comprise bolts 30 extended through corresponding bores in the shield rim 26 and threadingly engaged with appropriately positioned, threaded bores formed in the vertical plate member 26. This means of fastening the shield 23 to the vehicle 10 has the advantage that few alterations need be made to the vehicle 10, permitting convenient use of the shields 23 on an existing vehicle without the necessity of extensive modifications. Other fastening means well-known in the art, such as mutually engageable coupling devices employing detent locking mechanisms, are also suitable.

In addition, and with continued primary reference to the right, front shield 23, each of the power sensing shields 23, 23B, 23C is equipped with electrical contact means, consisting of a plurality of contact clips 31 (FIGS. 3 and 5) which are aligned in horizontal register with respective ones of the brushes 17 of the terminals 16 upon the shield 23 being affixed in covering relationship therewith, as shown most clearly in FIG. 3. Two such contact clips 31 are employed in the present embodiment, for reasons which will become apparent from the description to follow. Each contact clip 31 is preferably formed of a resilient and electrically conductive material, such as a phosphor-bronze alloy, and suitably comprises a strip of the material approximately 1/16 inches thick and ½ inches wide. As seen most clearly in FIG. 5, each contact clip is suitably bonded, at its mid portion, to the inside surface of the shield 23 and extends predominately horizontally alongside a respective, adjacent electrical brush 17. One end of each clip 31 is bent toward and biased into contact with the respective adjacent brush 17, and the other end is suitably raised with respect to the adjacent surface of the shield 23 and electrically connected to a lead 32, as will be described. Other means for making electrical connection with respective ones of the brushes 17 are also suitable; for example, in some applications it may be desirable to mount rigid electrical contacts (not shown) in the shield 23 in alignment with the respective brushes and to employ the outward spring bias of the linkages supporting the brushes 17 to maintain electrical contact between the brushes and the contacts. When the shield 23 is fastened in proper alignment with the brush assembly 16, the contact clips 31 thus receive any electrical potential which is present in the respective brushes 17 contacted by the clips 31.

With reference now primarily to FIG. 6 and additionally to FIG. 3, the two contact clips 31 of the shield 23 have connection by means of respective leads 32 to a sensing circuit 33 mounted within the shield 23, the circuit 33 being identical to and representative of similar circuits 33B and C in shields 23B and 23C and suitably being mounted upon a circuit board bonded to the inside surface of the planar portion 24 of the shield 23 at a portion thereof spaced to one side of the brushes 17, 17'. Respective resistors 34 (FIG. 6) are connected in series between the contact clips 31 and the sensing circuit 33 for reducing the voltage reaching the sensing circuit 33. Each sensing circuit 33 includes a transformr 35 connected to the resistors 34 for reducing the voltage received from the contact clips 31. In the present, exemplary embodiment, a three-phase current of 480 volt potential is conducted to the vehicle 10, and 480 volt potential is present across any two of the three power brushes 17 of each of the terminals 16 when the vehicle 10 is connected to the power source. The transformer 35 has a primary-secondary ratio of 20:1 and is thus effective to reduce the periodic, 480-volt potential between the respective contact clips 31 to a 24-volt AC level. The secondary windings of the transformer 35 are in turn connected to the input terminals of a single phase, full wave bridge rectifier 36, suitably of the type manufactured by Motorola Semiconductor Products, Inc. as Model No. MDA 920A-3. The bridge rectifier 36 is connected for converting the 24-volt alternating current from transformer 35 to 24-volt, pulsating direct current, and an RC filtering circuit comprising a filtering capacitor 37 and a bleeder resistor 38 is connected across output leads 39, 40 from the rectifier bridge 36 for reducing voltage variations in the output from rectifier bridge circuit 36. The output leads 39, 40 are connected to circuitry within the power connecting shield 23A, which will be described below. Thus, each of the sensing circuits 33, 33B, and 33C of the three power sensing shields 23, 23B, 23C, along with the respective contact clips 31 and resistors 34, comprises a means for emitting a continuous electrical signal when the respective cover or shield 23 is fastened in covering relationship with the brushes 17 of the respective terminal 16. No signal is emitted until the respective shield 23 is aligned with the respective terminal 16 by the fastening means 30 and is thus in covering relationship with the brushes 17, because the contact clips 31 do not receive voltage to activate the sensing circuit 33 until the shield 23 is fastened in place. Each of the sensing circuits 23, 23B, 23C thus comprises a means for emitting a continuous signal by transforming relatively high voltage, alternating current received from the power source 19 (FIG. 2) by the brushes 17 of the respective terminal 16 (as will be more fully discussed below) into a direct current signal of relatively lower voltage.

With continued reference to FIG. 6, the output leads 39, 40 of the sensing circuit 33 are connected to the power connecting shield 23A for conducting, to circuitry within the power connecting shield and to be described, the output signal emitted by the sensing circuit 33. The output leads 39, 40 are shown as a single cable 41, in FIG. 2, the cable 41 being supported suitably by brackets 42 positioned on the side of the vehicle 10. The similar sensing circuit 33B mounted in the left, front insulative shield 23B and is similarly connected to the power connecting shield 23A by means of output leads 39B and 40B; similarly, the sensing circuit 33C installed in the left rear insulative shield 23C and is connected to the power connecting shield 23A by means of output leads 39C and 40C, lead 40C being connected in common with leads 40 and 40B to a common conductor 40A within shield 23A. Alternatively, the output leads 39, 39B, 39C and 40, 40B, 40C are permanently mounted within the vehicle 10 and connected to the respective sensing circuits 33, 33B, 33C by means of suitable electrical connectors (not shown) when the shields 23, 23B, 23C are mounted on the vehicle 10.

Mounted within the power connecting shield 23A are input bus conductors 49A, 50A, 51A which are connectable, through a suitable, three-conductor receptacle 53 and corresponding plug 54, to the power input cable 13 (FIG. 2) which comprises respective power input conductors or cables 49, 50, 51 (FIG. 6). The three-conductor receptable 53 is suitably mounted within the power connecting shield 23A and extended through a suitable opening through the shield 23A for receiving the plug 54. The input bus conductors 49A, 50A, 51A are electrically connected to respective ones of the brushes 17A of the terminal 16A by means of respective clips 62, of high power capacity, for transmitting power to the vehicle electrical system through cables 20, 20' and bus conductors 22. The high current capacity clips 62 are suitably of the type described above with respect to the power sensing shields 23, 23B, 23C but are formed of heavier material, for example, of a strip of phosphor-bronze alloy 1-inch wide and ⅛-inch thick.

A relay-actuated switch 64 is connected across the input bus conductors 49A, 50A, 51A and includes switch elements 65, 66, 67 which are respectively connected in series with input bus conductors 49A, 50A, 51A. A relay 69 is operatively connected to the switch elements 65, 66, 67 and is operable for disconnecting the switches 65, 66, 67 when actuated by a DC signal of, for example, 24 volts. The relay 69 is, for example, a three-pole power relay of a suitable power capacity.

A monitoring circuit 71 is also mounted within the power connecting shield 23A and includes a logic circuit 72, to be described, and a silicon-controlled rectifier 73 of relatively low power capacity such as, for example, SCR model 2N877-81 manufactured by the Silicon Products Department of the General Electric Company. A power supply circuit 33A, similar to the sensing circuits 33, 33B, 33C, has input leads 75, 76 connected, respectively, to any two of the input bus conductors 49A, 50A, 51A through respective resistors 31A and is provided for supplying low voltage DC current (e.g., 24V DC) to the monitoring circuit 71 and SCR 73, the power supply circuit 33A having a voltage reducing transformer 35A and a bridge rectifier 36A connected as in the sensing circuits 33, 33B, and 33C. The bridge rectifier 36A of the power supply circuit 33A has output leads 39A and 40A, lead 40A serving as a common or ground conductor for the monitoring circuit 71 and SCR 73, and output lead 39A being connected to one side of the coil of relay 69. SCR 73 has its cathode terminal connected via lead 77 to the common conductor 40A and its anode terminal connected via lead 78 to the other side of the coil of relay 69, and is thus connected as a switch between the relay 69 and the output terminals of the bridge rectifier 36A of the power supply circuit 33A. The SCR 73 is normally "open" or nonconductive, but is latched in a conductive state if a predetermined, threshold voltage signal is received at its gate terminal and remains conductive until the 480-volt source is disconnected from the vehicle 10.

The logic circuit 72 is of the type known in the art as a NAND logic gate, e.g., such as model 9962 Δ TL of the Fairchild Camera and Instrument Corporation, and is operable to emit an output signal when a minimum DC voltage signal is not received at each of a plurality of inputs. The logic circuit 72 has three input terminals connected serially through respective input buffer circuits 81, 81B, and 81C and respective leads 39, 39B, 39C to the sensing circuits 33, 33B, 33C. The buffer circuits 81, 81B, 81C are also respectively connected, through leads 82, 82B, and 82C, to common conductor 40A. A power input junction of the logic circuit is connected through lead 83 to a conductor 84 which is connected through a resistor 85 to the output lead 39A from power supply circuit 33A and, through resistor 86, to the common conductor 40A. The logic circuit 72 also has a ground terminal connected via lead 87 to the common conductor 40A. Resistors 85 and 86 thus comprise a voltage dividing circuit for supplying, via lead 83, a potential to logic circuit 72 which is reduced from that present between leads 39A and 40A, the values of resistors 85 and 86 being chosen, for example, to supply approximately 6-volts DC to the logic circuit 72 when 24 volts of potential is present between conductors 39A, 40A. A filtering capacitor 88 is also connected across the power supply output conductors 39A, 40A and cooperates with the summed resistance of resistors 85, 86 as an RC-filter circuit, e.g., corresponding to the circuit 37, 38 of the sensing circuit 33. An indicating lamp 89 is connected across the coil of relay 69 for providing a visual indication that operating current is present in the coil and that dangerous voltage is removed from the brushes 16, 16A, B, C.

The logic circuit 72 has an output junction connected through a lead 90 to the base of an NPN driver transistor 91 such as a 2N720 transistor, the transistor 91 having its emitter junction connected via lead 92 to the gate terminal of SCR 73 and, via lead 93 and resistor 94, to the lead 77 which connects to the common conductor 40A. The collector of transistor 91 is connected to the lead 84 between resistors 85 and 86 and thus receives the same reduced potential which is conducted through lead 83 to the logic circuit 72. It will be apparent to those in the art that the transistor 91 and its associated circuitry comprises means for amplifying the output of logic circuit 72 for positively switching the SCR 73 to an "on" or conductive condition when a relatively small output signal is received from logic circuit 72.

Figure 7:
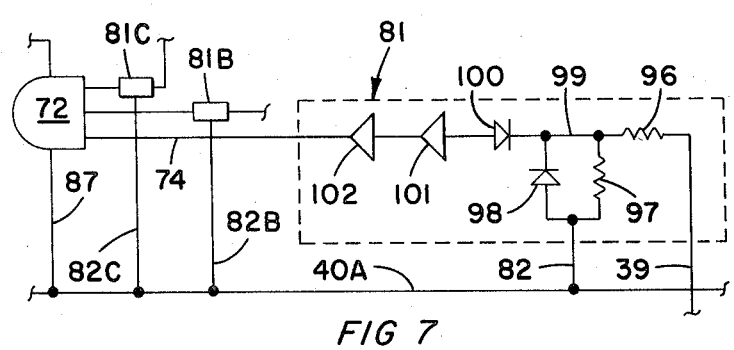
FIG. 7 is a schematic diagram of a portion of the circuit shown in block form in FIG. 6.

The input buffer circuits 81, 81B, and 81C are provided to protect the low level input circuitry of logic circuit 72 from transients or "spikes" of dangerously high voltage, such logic circuits being of quite low power-handling capability. With reference to FIG. 7, the buffer circuit 81, typical of circuits 81B and 81C, is shown in more detail. The buffer circuit 81 is connected in series between the output lead 39 from sensing circuit 33 (FIG. 6) and, via lead 82, the respective input terminal of logic circuit 72. A resistor 96 of approximately 270 ohms is connected in series between the output lead 39 from sensing circuit 33 (FIG. 6) and the remainder of the buffer circuit 81 for reducing the voltage of incoming signals. A relatively higher resistance 97 of, e.g., 4.7K ohms is connected in parallel with an IN-3611 diode 98, the diode 98 and resistor 97 being connected in series betwen a lead 99 from the resistor 96 and the lead 82 to the common conductor 40A. A second IN-3611 diode 100 is connected to the lead 99 between the connection to diode 98 and a pair of serially connected inverters 101, 102. Diodes 98 and 100 have their respective cathode junctions connected to the lead 99 and thus serve to dissipate transients or spikes of either polarity. The inverters 101, 102 each suitably comprises 1/6 of a Fairchild HLLDJµL 9109 integrated inverter circuit, and the two inverters 101, 102 thus function as a double inverting buffer for protecting the logic gate 72.

In use, the monitoring circuit 71 is operable to actuate the relay 69 to open switches 65, 66, 67, when power is received through power input cables 49A, 50A, 51A, unless each of the power sensing shields 23, 23B, 23C is fastened in covering relationship with the respective terminals 16, 16B, 16C, and to prevent operation of relay 69 and switch 64 to disconnect the power source 19 from the brushes 17 when a signal is received from each of the sensing circuits 33. (The monitoring circuit 71 is also operable to prevent power from being supplied to the terminal 16A if cover 23A is not fastened over terminal 16A, since power cannot be conducted to the brushes 17A until the power conducting contact clips 62 are in contact with the brushes 17A when the cover 23A is positioned in proper alignment with terminal 16A). When it is desired to power the vehicle 10 during off-guideway operation, the insulative shields 23, 23A, 23B, 23C are first fastened in place over the four terminals 16, 16A, 16B, 16C by means of bolts 30 or by the use of other suitable fastening means, whereupon the respective contact clips 31 of shields 23, 23B, 23C and the power connecting clips 62 of power connecting cover 23A are brought into contact with the respective associated brushes 17, 17B, 17C, 17A and thus into electrical conduction therewith. The power cable 13 (FIG. 2), connected to receive power from a suitable power source such as generator 19, is then connected to the input bus conductors 49A, 50A, 51A by inserting the plug 54 into the receptacle 53 mounted within the power connecting shield 23A. If the switch assembly 64 is in its normal, closed condition, three-phase 480V potential is then conducted by power input cables 49A, 50A, 51A to the brushes 17A and from thence via cables 20, 20f and power bus conductors 20 to the electrical system of the vehicle 10 for powering the vehicle, thus permitting operation of the vehicle in areas remote from the guideway 11 (FIG. 1). When power is connected thusly to the vehicle 10, power is also conducted, through leads 75 and 76 of the power supply shield 23A, to the power supply circuit 33A and, via respective pairs of contact clips 31 and input leads 32 in each of the power sensing shields 23, 23B, 23C, to the sensing circuits 33, 33B, 33C. Provided each of the shields 23, 23B, 23C is properly fastened, each of the sensing circuits 33, 33B, 33C is then operable to produce a continuous signal of approximately 24-volts DC across its output leads 39, 40; 39B, 40B; 39C, 40C; and DC signals from the sensing circuits 33, 33B, 33C are conducted via leads 39, 39B, 39C and buffer circuits 81, 81B, 81C to the input terminals of logic circuit 72. Input buffer circuits 81, 81B, 81C protect the logic circuit 72 by attenuating any excessive peaks or transients in the input signals, and logic circuit 72 remains in its "off" condition in which no output signal is conducted via output lead 90 to the base of NPN transistor 91. Transistor 91 thus remains turned "off," and no current is conducted therethrough to the gate electrode of SCR 73; SCR 73 thus also remains in an open or nonconductive state, and current is not permitted to flow through lead 78 to the relay 69. Relay 69 thus remains in a non-activated condition in which the switch 64 remains closed, permitting power to be conducted continuously to the veicle power system.

Upon any one of the shields 23, 23B, 23C being removed or moved out of proper alignment with the respective, associated terminal 16, 16B, 16C, power is not received by the respective sensing circuit 33, 33B, 33C, and the DC signal to logic circuit 72 from the respective sensing circuit is then cut off. Logic circuit 72 is then turned "on," causing an output signal to be conducted through output lead 90 to the base of transistor 91 to turn the transistor "on," thereby causing it to conduct the potential from lead 84 to the gate terminal of the SCR 73, which latches the SCR in an "on" or conducting state, causing current to be conducted via leads 77-78 to the relay 69. Relay 69 is then energized and caused to disconnect the switches 65, 66, 67, thus shutting off power to the vehicle 10 and ensuring that the possibly exposed terminals 16, 16B, 16C do not present an electrical hazard to bystanders. SCR 73 remains latched in its conducting state until power is removed from the system as by disconnecting the plug 54, whereupon it is turned "off" and remains in its open or "off" condition when power is again conducted to the vehicle 10, provided that the shields 23, 23B, 23C are then fastened in place. During the period in which current is conducted through the coil of relay 69, a small current is conducted to the indicating lamp 89, which thus provides a visual indication of the open switch 64.

While a preferred embodimant has thus been described which is particularly useful in powering a guideway-following vehicle during off-guideway operation, the invention, of course, is not limited to such an embodiment or use. For example, the circuitry of the power connecting shield 23A alternatively is permanently installed within the vehicle 10 in another embodiment (not shown), additional input connectors being provided adjacent the monitoring circuit 72 for removably receiving the output leads 39, 39C, and 39B of the sensing circuits 33, 33B, 33C. In such an embodiment, the means for connecting the terminals 16 to the power source 19 suitably comprises a connecting device affixed to the vehicle 10 rather than to one of the shields 23. The relay operated switch 64 may then be connected across the power input conductors 49A, 50A, 51A at a location within the vehicle and an additional power sensing shield provided for covering the right rear terminal 16A. While the present embodiment employs two contact clips 31 for each sensing circuit 33, other embodiments are possible wherein only one contact clip is employed and wherein the vehicle frame or body serves as a second or ground conductor.

It will thus be apparent to those in the art that the present safety circuit comprises a relatively inexpensive but reliable means for protecting bystanders from accidental electrical shock from exposed electrical terminals of a vehicle. The preferred embodiment has the additional advantage of being compatable with existing electrically powered vehicles having exposed brush assemblies, no substantial modification of the vehicle being required. Finally, the preferred embodiment provides a convenient and safe provision for connecting external power to a vehicle when operation of the vehicle is required in areas remote from its normal power supply system.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. For a vehicle having a plurality of electrical collector means each comprising at least one electrically conductive element, apparatus for shielding the conductive elements during periods in which the conductive elements receive electrical power from a power source, the apparatus comprising:

a plurality of insulative shields, each adapted to cover one of the collector means, fastening means being provided for permitting each shield to be removably fastened to the vehicle in covering relationship with the respective collector means;

means for connecting the collector means to a source of electrical power;

a plurality of sensing means, each comprising a means for emitting a continuous electrical signal when a respective one of the shields is fastened in covering relationship with a respective one of the collector means when power is conducted to the collector means;

switching means, connected between the power source and the conductive elements, operable for disconnecting the power source from the conductive elements; and monitoring means, electrically connected to each of the sensing means, for monitoring the signals from the sensing means and for preventing operation of the switching means to disconnect the power source when a signal is received from each of the sensing means and, upon no signal being received from one of the sensing means, for actuating the switching means to disconnect the power source from the conductive elements.

2. The apparatus of claim 1, wherein each of the sensing means is affixed to a respective one of the shields.

3. The apparatus of claim 1, the power source comprising a source of alternating current of relatively high voltage, each of the sensing means comprising a means for emitting a continuous signal by transforming relatively high voltage, alternating current, received from the power source by at least one element of the respective collector means, into a direct current signal of relatively lower voltage.

4. The apparatus of claim 1, each of the sensing means including electrical contact means for contacting at least one element of the respective collector means when the respective shield is affixed in covering relationship with the respective collector means.

5. The apparatus of claim 1, wherein each of the conductive elements comprises a brush element of the type adapted to slidably contact and receive electrical power from a power rail.

6. The apparatus of claim 1, wherein the vehicle comprises a vehicle adapted to travel on a guideway having electrical power rails extending along the guideway for transmitting power to the vehicle, and wherein the at least one conductive element of each collector means comprises a brush element adapted for contacting a respective one of the power rails.

7. The apparatus of claim 1, wherein the vehicle is adapted to operate both on and off a guideway and wherein the means for connecting the collector means to a power source includes a receptacle mounted in one of the shields, the receptacle comprising a means for receiving power from the power source during operation of the vehicle off the guideway.

8. The apparatus of claim 1, wherein the switching means includes a relay and wherein the monitoring means includes silicon-controlled rectifier switching means connected to the relay.

9. For an electrically powered vehicle adapted to travel both on and off of a guideway, power rails, extending along the guideway, being provided for conducting power to the vehicle during operation of the vehicle on the guideway, the vehicle having a plurality of electrical terminals each comprising a plurality of power collecting brushes which are adapted for slidably contacting respective ones of the power rails, apparatus for preventing electrical shock caused by accidental contact with power collecting brushes of the exposed terminals during periods in which the vehicle is operated off of the guideway, the apparatus comprising:

a plurality of insulative shields each adapted to cover the power collecting brushes of one of the terminals, fastening means being provided for permitting each shield to be removably fastened to the vehicle in covering relationship with the power collecting brushes of the respective terminal;

connecting means for connecting the power collecting brushes of the terminals to a source of electrical power for powering the vehicle off the guideway;

a plurality of sensing means, each comprising a means for emitting a continuous electrical signal when a respective one of the shields is fastened in covering relationship with the power collecting brushes of one of the terminals;

switching means, connected between the power source and the power collecting brushes, operable for disconnecting the power source from the power collecting brushes; and monitoring means, electrically connected to each of the sensing means, for monitoring the signals from the sensing means and for preventing operation of the switching means to disconnect the power source when a signal is received from each of the sensing means and, upon no signal being received from one of the sensing means, for actuating the switching means to disconnect the power source from the power collecting brushes.

10. The apparatus of claim 9, wherein the connecting means includes a receptacle mounted in one of the shields.

11. The apparatus of claim 9, wherein each of the sensing means is mounted within a respective one of the shields.

12. The apparatus of claim 9, the power source comprising a source of alternating current of relatively high voltage, each of the sensing means comprising a means for emitting a continuous signal by transforming relatively high voltage, alternating current, received from the power source by the brushes of the respective terminal, into a direct current signal of relatively lower voltage.

13. The apparatus of claim 9, each sensing means including electrical contact means for contacting the power collecting brushes of the respective terminal when the shield is affixed in covering relationship with the power collecting brushes of the terminal.

14. The apparatus of claim 9, wherein the switching means includes a relay and wherein the monitoring means includes a silicon-controlled rectifier switch connected to the relay.

* * * * *

PO-1050
(5/69)

UNITED STATES PATENT OFFICE
CERTIFICATE OF CORRECTION

Patent No. 3,762,515    Dated  2 October 1973

Inventor(s)    JAMES M. RUSHING

It is certified that error appears in the above-identified patent and that said Letters Patent are hereby corrected as shown below:

Column 2, line 19, "collectors" should read -- collector --, line 20, "on" should read -- or --, line 27, "im" should read -- in --.

Signed and sealed this 16th day of April 1974.

(SEAL)
Attest:

EDWARD M.FLETCHER,JR.
Attesting Officer

C. MARSHALL DANN
Commissioner of Patents